US012583068B2

(12) United States Patent (10) Patent No.: US 12,583,068 B2
Hediger (45) Date of Patent: Mar. 24, 2026

(54) CLAMPING ARRANGEMENT

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 688 days.

(21) Appl. No.: 18/057,499

(22) Filed: Nov. 21, 2022

(65) Prior Publication Data

US 2023/0182250 A1 Jun. 15, 2023

(30) Foreign Application Priority Data

Dec. 13, 2021 (CH) ................................ 070704/2021

(51) Int. Cl.
| | |
|---|---|
| *B23Q 3/00* | (2006.01) |
| *B23Q 3/08* | (2006.01) |
| *B23Q 3/10* | (2006.01) |
| *B23Q 16/00* | (2006.01) |

(52) U.S. Cl.
CPC .............. *B23Q 3/105* (2013.01); *B23Q 3/08* (2013.01); *B23Q 3/103* (2013.01); *B23Q 16/001* (2013.01)

(58) Field of Classification Search
CPC .......... B23Q 3/103; B23Q 3/08; B23Q 3/105; B23Q 16/001
See application file for complete search history.

(56) References Cited

U.S. PATENT DOCUMENTS

| | | | | |
|---|---|---|---|---|
| 6,641,128 B2 * | 11/2003 | Fries | .................... | B23Q 11/005 |
| | | | | 279/4.06 |
| 7,758,031 B2 * | 7/2010 | Yonezawa | .............. | B23Q 3/183 |
| | | | | 269/309 |
| 7,819,392 B2 * | 10/2010 | Kuroda | ................ | B23Q 1/0081 |
| | | | | 269/309 |
| 8,448,931 B2 * | 5/2013 | Kitaura | .................. | B23Q 3/183 |
| | | | | 269/309 |
| 8,590,878 B2 * | 11/2013 | Haruna | .................. | B23Q 1/009 |
| | | | | 269/309 |

(Continued)

FOREIGN PATENT DOCUMENTS

| | | |
|---|---|---|
| DE | 19703354 C1 | 3/1998 |
| DE | 19917146 A1 | 10/2000 |

(Continued)

*Primary Examiner* — Lee D Wilson
(74) *Attorney, Agent, or Firm* — Maginot, Moore & Beck, LLP

(57) ABSTRACT

A clamping arrangement has a clamping device is fastened fastenable on a clamping base, and a clamping element able to be tightened thereon. The clamping device has a clamping module with clamping members that can be fixed by a fixing element on the clamping base, wherein the fixing element is configured such that the clamping module is fixed in the X-Y plane in a floating manner. The clamping module is displaceable in the fixed state of the fixing element with respect to the fixing element in the X-Y plane, but is non-displaceable in the Z-direction. The fixing element is provided with Z-support surfaces for the clamping element. The clamping arrangement is particularly suitable for a large clamping system, so that thermally caused dimension changes of the workpiece carrier with respect to the clamping base can be equalized with repeatable accuracy, without the clamping system being over-constrained geometrically/mechanically in the X-Y plane.

20 Claims, 6 Drawing Sheets

(56)          References Cited

U.S. PATENT DOCUMENTS

| | | | | |
|---|---|---|---|---|
| 8,622,377 B2 * | 1/2014 | Konrad | ............... | A61C 13/0022 |
| | | | | 269/287 |
| 2003/0071407 A1 * | 4/2003 | Haruna | ................ | B23Q 1/0081 |
| | | | | 269/309 |
| 2004/0207141 A1 * | 10/2004 | Kuroda | ................. | F16B 21/165 |
| | | | | 269/309 |
| 2006/0055099 A1 * | 3/2006 | Haruna | ................ | B23Q 1/0081 |
| | | | | 269/309 |
| 2006/0220292 A1 * | 10/2006 | Dahlquist | ............ | B23Q 1/0063 |
| | | | | 269/309 |
| 2007/0262508 A1 | 11/2007 | Haruna | | |
| 2010/0252978 A1 * | 10/2010 | Philippe | ................. | F16M 11/14 |
| | | | | 269/309 |
| 2013/0043634 A1 * | 2/2013 | Kitaura | ................. | B23Q 3/183 |
| | | | | 269/309 |
| 2015/0054211 A1 * | 2/2015 | Hediger | ............... | B23Q 1/0072 |
| | | | | 269/309 |
| 2015/0321302 A1 * | 11/2015 | Kawakami | ............... | B23Q 3/18 |
| | | | | 269/309 |
| 2023/0182250 A1 * | 6/2023 | Hediger | ................... | B23Q 3/08 |
| | | | | 269/309 |

FOREIGN PATENT DOCUMENTS

| | | | | | |
|---|---|---|---|---|---|
| DE | 202016101411 U1 | 6/2017 | | | |
| DE | 102016219728 A1 | 4/2018 | | | |
| EP | 0818270 A1 | 1/1998 | | | |
| EP | 1078713 A1 | 2/2001 | | | |
| EP | 1743733 A1 | 1/2007 | | | |
| EP | 4194141 A1 * | 6/2023 | ........... | B23Q 16/001 |

\* cited by examiner

CLAMPING ARRANGEMENT

PRIORITY CLAIM

This application claims priority to Swiss Application No. CH070704/2021, filed on Dec. 13, 2021, the entire disclosure of which is incorporated herein by reference.

BACKGROUND

The present invention relates to a clamping arrangement configured with a clamping device able be fastened on a clamping base and with a clamping element able to be tightened thereon.

Clamping arrangements of the type in question here serve for the position-defined tightening of clamping elements by means of a clamping device. Here, the respective clamping device is usually mounted securely on a clamping base, for example on a machine table of a processing machine, while the clamping element or respectively the clamping elements are generally arranged on workpiece carriers—pallets.

In order to be able to tighten large workpiece carriers in a positionally accurate manner, generally a clamping system is used having several clamping devices mounted on a clamping base and with a corresponding number of clamping elements mounted on a workpiece carrier. A problem of such clamping systems consists in that they must compensate dimension changes of the workpiece carrier with respect to the clamping base. In addition, care must be taken that the clamping system is not overconstrained geometrically/mechanically in the X-Y plane.

In order to be able to absorb dimension changes of the workpiece carrier with respect to the clamping base, zero-point clamping systems with clamping chucks for the tightening of clamping bolts are known from the prior art, wherein the clamping chucks are provided with conical mounts, mounted elastically in radial direction, for the clamping bolts. In such systems a very high manufacturing accuracy of the infeed elements with respect to one another is necessary.

In order to prevent a geometric overconstraining of the type mentioned, a device is known from EP 0 403 428 A2 for the positionally defined clamping of a workpiece. This device has at least two clamping chucks provided with centering pins, and a corresponding number of upper parts, provided with clamping spigots, and able to be tightened thereon. The upper parts are arranged on a workpiece mount. The respective upper part is provided with centering slits corresponding to the centering spigots. In addition, each upper part has a round clamping spigot—tension bolt-, which is able to be tightened in a central mount of the respective clamping chuck by means of clamping balls. Whereas each clamping chuck is provided with four centering spigots, only the one upper part is provided with corresponding centering slits. The other upper part or respectively the other upper parts is/are provided only with two centering slits. Thus, the position of the workpiece mount is to be established in X- and Y-direction with the one upper part, whereas with the other upper part or respectively with the other upper parts, only the angle position around the Z-axis is to be established.

Although such a device has proved itself in practice, its structure is relatively complex and is only suitable in a limited manner for the reproducibly accurate tightening of large and heavy workpiece carriers, especially as the respective round clamping spigot must be positioned very precisely with respect to the central and likewise round mount of the respective clamping chuck. In addition, dimension changes of the workpiece carrier with respect to the clamping chucks can only be absorbed in a limited manner.

Furthermore, from EP 1 743 733 A1 a quick clamping device with exchange cylinder is known. The quick clamping device comprises, in addition to a retractable nipple, to be connected to a pallet, a closure housing which is closed from above by means of a cover. The cover has an inlet opening for the said retractable nipple. In the interior of the closure housing, a catching device for the retractable nipple is arranged, which consists of a number of locking bodies distributed uniformly over the circumference. The actuation of the locking bodies takes place via a piston, arranged in the inner side of the closure housing, loaded into a clamping position by means of a spring assembly. In the closure housing, the exchange cylinder, configured in a pot-shaped manner, is received, which is mounted in a floating manner in the housing. The exchange cylinder is mounted in the X-Y plane, but free of play, as the piston is guided free of play in radial direction in the cover, and the replacement cylinder in turn receives the piston radially in a manner free of play.

EP 0 818 270 A1 discloses a clamping device with a clamping element to be arranged on the tool machine, and with a tool carrier able to be tightened thereon. The round clamping element is provided with a central clamping bolt which is inserted free of play into the base body of the clamping element. The round workpiece carrier has a central bore on the side walls of which the clamping bolt of the workpiece carrier can engage for the tightening thereof. The workpiece carrier is provided with an annularly circumferential, downwardly projecting support member, which protects the centering members from damage.

Finally, from DE 29802835U1 a coupling having two coupling members and a clamping device is known, which for positioning in the X-Y plane has xy reference elements arranged at the first coupling member, and xy reference counter-elements arranged at the second coupling member. Whereas the xy reference counter elements arranged at the second coupling member are formed in a fixed manner, the xy reference elements arranged at the first coupling member are configured so as to be elastically yielding. Through suitable design of the elastic reference elements, a thermal positional deviation is to be distributed onto several shoulders, i.e., elastic reference elements, with the consequence that the close tolerance of the location positioning is to be able to be maintained.

SUMMARY OF THE DISCLOSURE

It is an object of the invention to create a clamping arrangement, belonging to the technical field named in the introduction, wherein the clamping device is to receive or compensate tolerances or respectively dimension changes, in the X-Y plane, of a workpiece carrier, which is tightened by means of a clamping element or respectively clamping elements on the respective clamping device, without elastic centering elements having to be provided, wherein the clamping arrangement is also to be suitable in particular as a module for constructing a clamping system.

According to the invention, the clamping arrangement has a clamping device which is to be fastened on a clamping base, and a clamping element able to be tightened thereon, wherein the clamping device has a clamping module provided with clamping members, which clamping module is able to be fixed on the clamping base by means of a fixing element, and wherein the fixing element is configured such that the clamping module is thus able to be fixed in the X-Y plane on the clamping base in a displaceable manner.

By the clamping module of the clamping device being fastened in a displaceable manner on the clamping base by means of the fixing element in the X-Y plane, the fundamental prerequisite is created so that the respective clamping device can absorb dimension changes of a workpiece carrier which is to be tightened on the clamping base.

Thus, in a preferred further development, provision is made that the clamping module in the fixed state of the fixing elements is displaceable with respect to the fixing element in the X-Y plane, whereas in Z-direction by means of clearance fit it is received in the fixing element and is thus substantially non-displaceable in Z-direction, and that the fixing element is provided with Z-support surfaces for the clamping element. Thereby, it is ensured that the clamping module is able to compensate tolerances in the X-Y plane, however can transfer clamping forces in Z-direction, and that the Z-positioning of the clamping element takes place at the immovable fixing element which, in contrast to the clamping module, can be configured substantially more simply for receiving high forces in Z-direction. In addition, the requirements with regard to the manufacturing tolerances compared to clamping systems with conical centering elements are substantially less, because the infeed only has to be sufficiently large in order to compensate tolerances.

In a particularly preferred further development, the fixing element has centering grooves or centering cams, and the clamping element has centering cams or respectively centering grooves corresponding thereto for centering the clamping element with respect to the fixing element in the X-Y plane in one direction. This configuration is advantageous in particular for zero point clamping systems having several clamping arrangements, because by means of the centering elements the displaceability of a clamping module with respect to the associated clamping device can be limited to one direction, so that with corresponding arrangement of the clamping devices and of the clamping elements the zero point of the clamping system is always at the same position, despite displaceability of the respective clamping module, which ultimately enables a very precise clamping.

Preferably, the clamping module is configured to be substantially cylindrical, and the fixing element to be substantially ring-shaped, wherein the clamping module is received in the X-Y plane with radial play in a floating manner in the fixing element. This configuration enables a particularly simple construction of the clamping module in combination with a universal applicability. Thanks to this configuration, only the centering elements of the clamping device have to be positioned/aligned at an exact angle during assembly, but not the clamping module itself.

In a particularly preferred further development, the clamping module is provided on the outer side with a circumferential shoulder, and the fixing element on the inner side is provided with a recess configured in a corresponding manner thereto, wherein the outer diameter of the shoulder is smaller by at least 0.2 mm, in particular by at least 0.5 mm than the diameter of the recess. The difference between outer diameter of the shoulder and diameter of the recess determines the maximum displaceability of the clamping module in the fixed state in the X-Y plane. This configuration is able to be realized simply and economically.

The clamping module is preferably received in Z-direction by means of clearance fit in the fixing element, in particular by the height of the shoulder being adapted to the height of the recess such that in Z-direction a clearance fit is formed between the shoulder and the recess. With such a configuration, despite displaceability of the clamping module in the X-Y plane, it can be ensured that the clamping module is supported in Z-direction in a form-fitting manner in the fixing element and can transfer high clamping forces.

A further preferred further development makes provision that the clamping module is provided with a plurality of clamping members, arranged distributed over the circumference, and the clamping element is provided on the inner side with an annularly circumferential clamping surface against which the clamping members abut for tightening. Such a configuration is suitable in a particularly advantageous manner for the transferring of high clamping forces, because the clamping module, distributed over the circumference, can be provided with a very large number of clamping members in the order of ca. 10 to 20 pieces, and the clamping module can be provided with a correspondingly large clamping surface.

Particularly preferably, the clamping module has a spring-loaded actuating piston which, for actuating the clamping members, is arranged axially movably in the interior of the clamping module. Such a configuration is simple to realize and enables a reliable function of the clamping device.

Most particularly preferably, the actuating piston is displaceable pneumatically or hydraulically from an active position in which it is under the action of springs and presses the clamping members radially outwards, into a starting position, in which the clamping members are relieved and are displaceable radially inwards. In this configuration, the actuating piston, under the action of the springs, also remains in the active position in the pressureless state, so that respective clamping element is tightened securely on the clamping device, even if for example a drop in pressure were to occur in the pneumatic or hydraulic system, especially as the actuating piston is held in the locking position in particular by means of self-locking.

Preferably the actuating piston is in operative connection with an ejection element, displaceable in Z-direction, which is movable beyond the upper side of the clamping module by means of the actuating piston. Such an ejection element can act as a kind of shock absorber during the placing of a workpiece carrier. In addition, a workpiece carrier can be slightly raised thereby, which is advantageous inter alia in order to bring clamping members into the pushed-back starting position by means of the clamping element.

In a most particularly preferred further development of the clamping arrangement, the actuating piston has depressions running in Z-direction, which are coordinated with the clamping members such that, in the active position of the actuating piston, these come to abut thereon at least in a linear manner. Through such depressions, in the load state, namely when during tightening of a clamping element high clamping forces act on the clamping members, an enlarged support surface is brought about between the respective clamping member and the actuating piston, so that compared to conventional clamping arrangements, in which the clamping balls come to abut against a flat surface in a punctiform manner, substantially higher forces can be transferred.

Preferably, the upper side of the clamping module is configured in a frustum-shaped manner, wherein the ejection element is arranged in the centre of the frustum. This configuration helps in order, on placing of a workpiece carrier or respectively clamping element, to centre the latter with respect to the clamping device after the rough aligning, by the respective clamping element sliding automatically along the frustum and centering itself in so doing.

A further embodiment of the invention consists in a clamping system in which clamping arrangements, configured according to the invention, are arranged in a particularly advantageous manner to form a clamping assembly. Such a clamping system is suitable in a particularly advantageous manner for the tightening of large to very large workpiece carriers. By the respective clamping module being mounted in a floating or respectively displaceable manner in the X-Y plane and the respective clamping device being provided with first centering elements and the associated clamping element being provided with further centering elements, corresponding thereto, for centering the respective clamping element with respect to the clamping device in a direction in the X-Y plane, wherein at least in the case of two clamping devices and two clamping elements arranged in a corresponding manner thereto, the directions in the X-Y plane are different, dimension changes of the workpiece carrier can be absorbed with a consistent zero point and with high clamping accuracy.

Thus in a preferred further development of the clamping system it is proposed that the clamping base is configured substantially in a rectangular manner and has an even number of clamping devices, wherein at least in each corner region a clamping device is arranged, wherein the longitudinal axis centre axes leading through the centering elements of the respective clamping device arranged in the corner region also lead through the centre of clamping devices lying diagonally opposite one another. This configuration produces a very stable clamping system with which in particular thermally caused dimension changes of the workpiece carrier can be absorbed.

In a preferred further development of the clamping system, the workpiece carrier is configured substantially in a rectangular manner and at least in each corner region a clamping element is arranged, wherein the longitudinal axis centre axes leading through the centering elements of the respective clamping elements arranged in the corner region also lead through the centre of clamping elements lying diagonally opposite one another. It is thereby ensured that the zero point of the clamping system is at a defined location and remains there even if individual or all clamping modules move for adapting to dimension changes of the workpiece carrier in the X-Y plane.

Particularly preferably, the respective clamping element is arranged in a recess of the workpiece carrier such that its planar underside is set back with respect to the underside of the workpiece carrier. In this way, the respective clamping element is received in the workpiece carrier in particular in a manner protected from mechanical damage.

From the following detailed description and the entirety of the claims, further advantageous embodiments and feature combinations of the invention emerge.

BRIEF DESCRIPTION OF THE DRAWINGS

The figures of the drawings used to explain an example embodiment show.

6

Figures 6, 7:
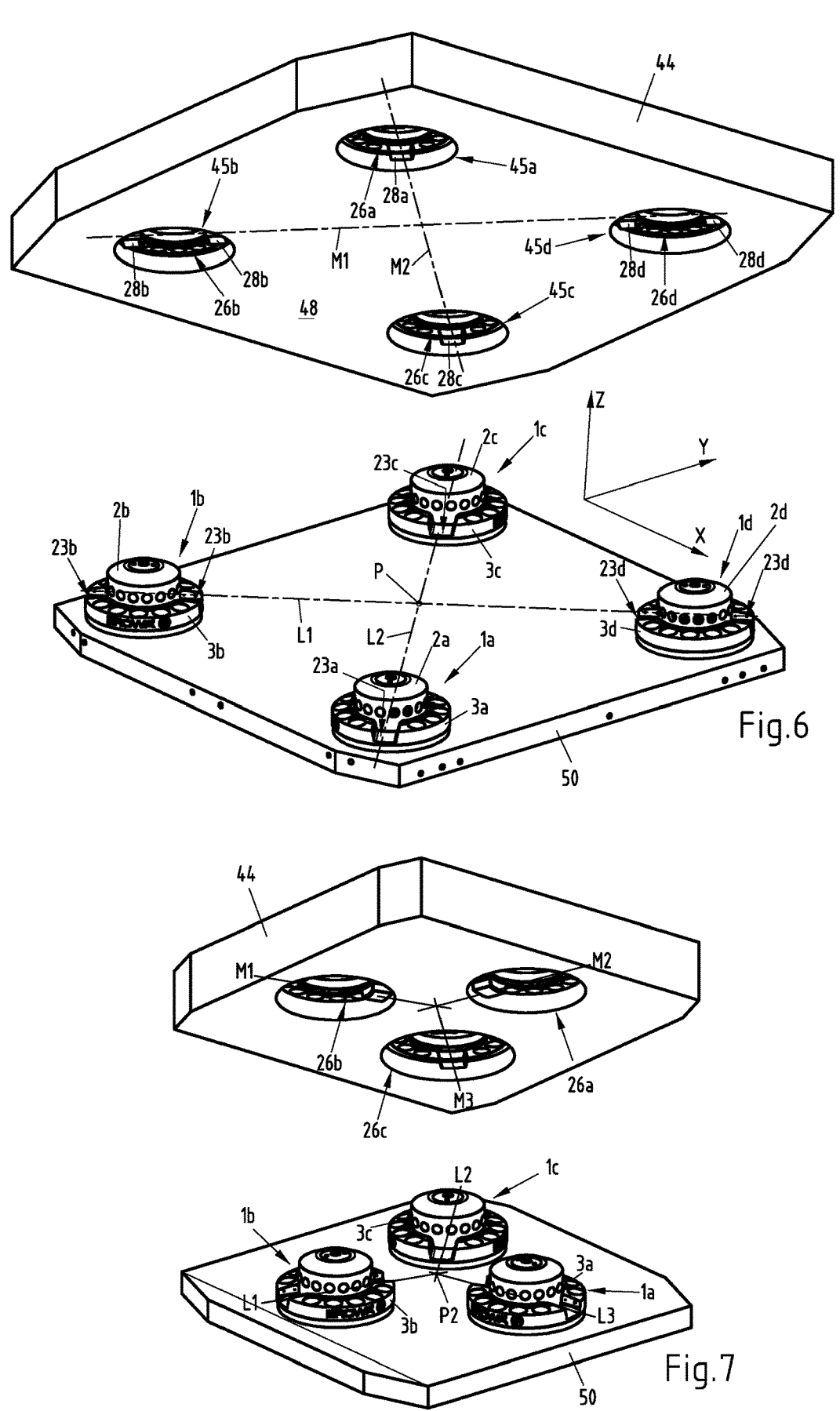
Figure 8:
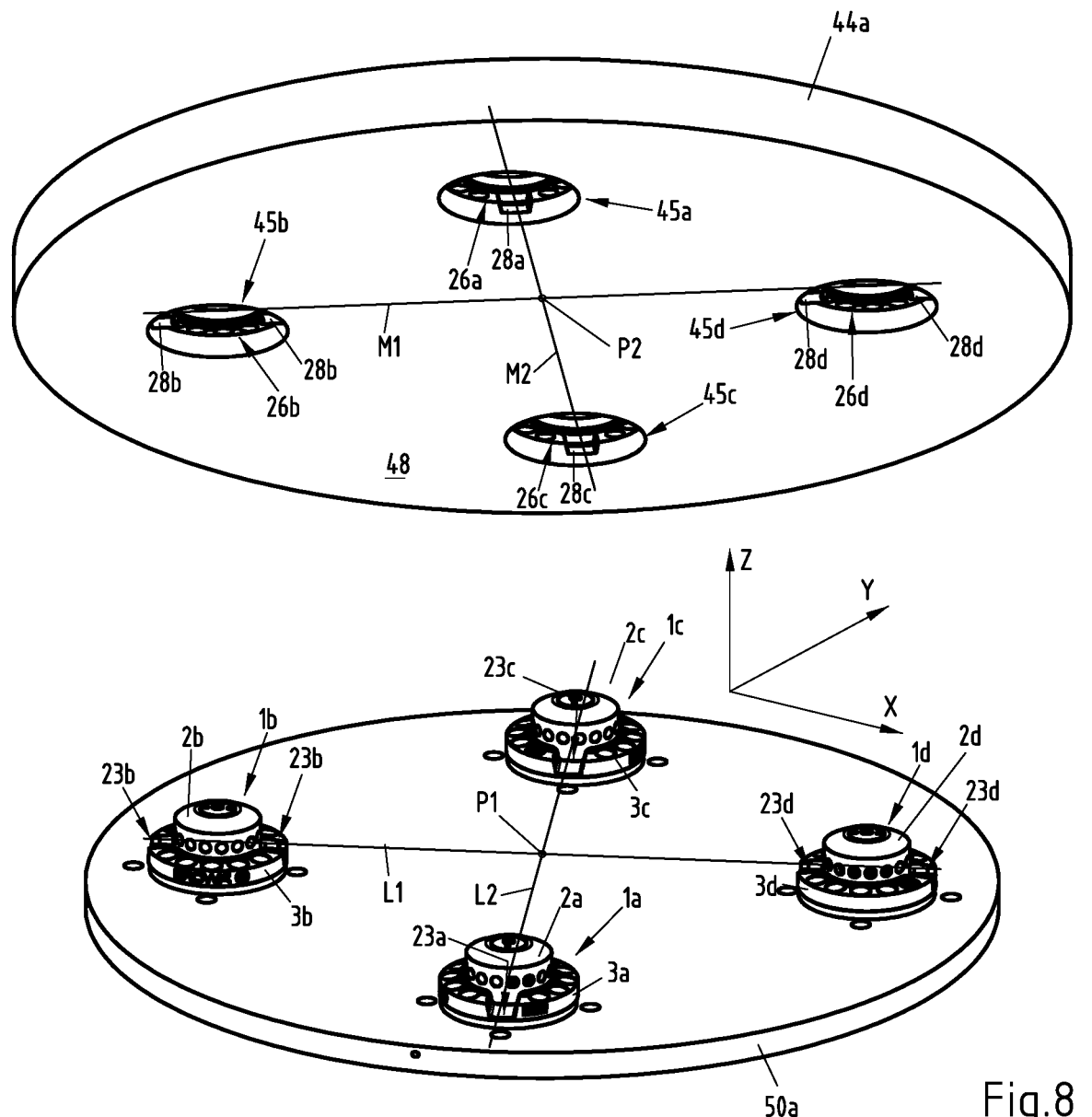

FIG. 6 a clamping system with four clamping devices configured according to the invention in perspective view;

FIG. 7 a clamping system with three clamping devices configured according to the invention in perspective view;

FIG. 8 an alternative example embodiment of a clamping device together with a workpiece carrier.

DETAILED DESCRIPTION

Figure 1:
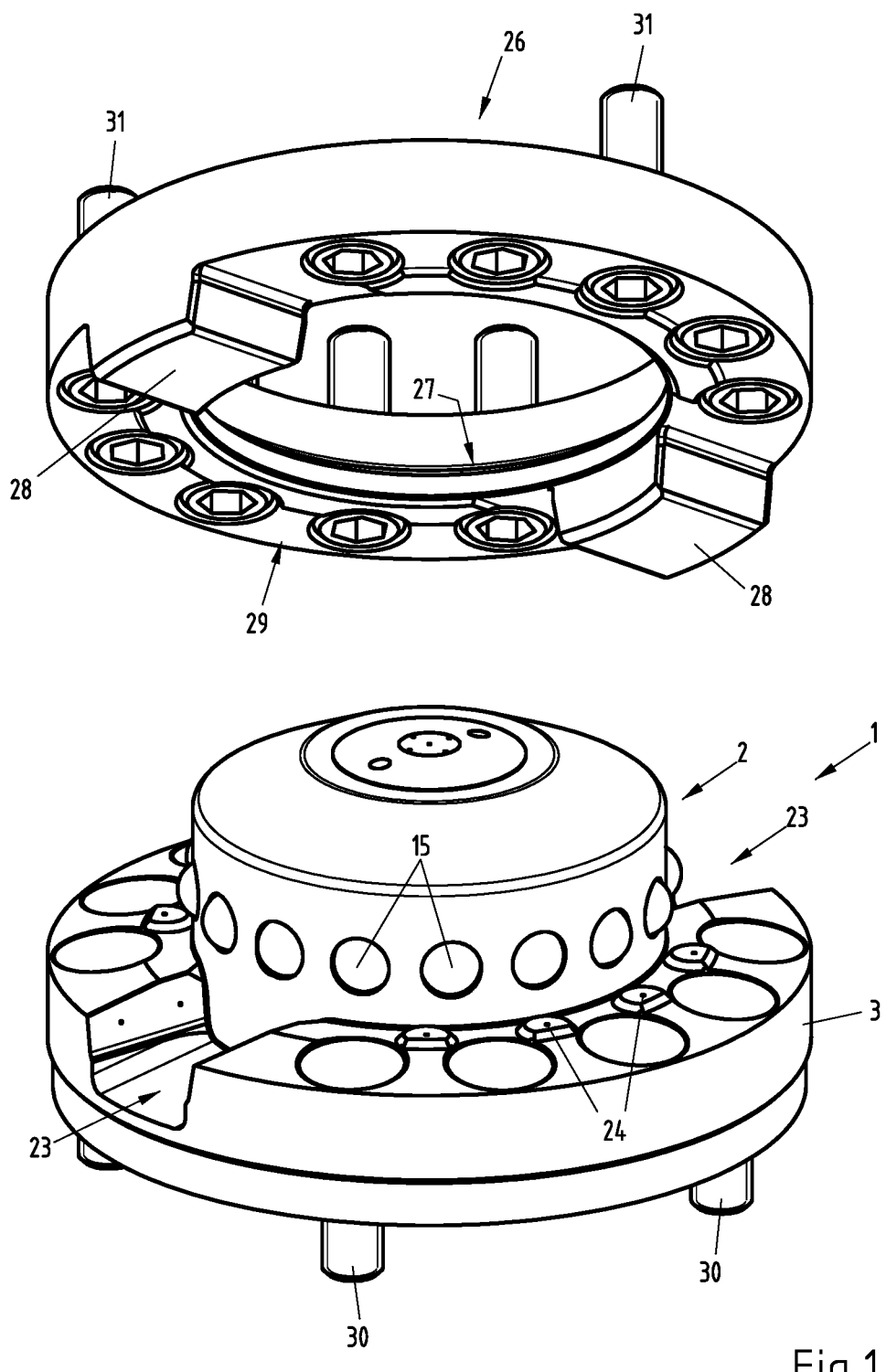
FIG. 1 the clamping arrangement, consisting of a clamping device and a clamping element, in perspective view.

FIG. 1 shows the clamping arrangement in perspective view. The clamping arrangement comprises a clamping device 1, also designated as clamping chuck, which is to be fastened on a clamping base such as a machine table, and a clamping element 26 able to be tightened thereon, which is arranged on a pallet serving as a workpiece- or tool-carrier. The fastening of the clamping device 1 on the clamping base and also of the clamping element 26 on the workpiece carrier takes place by means of a plurality of screws 30, 31 some of which are drawn by way of indication. The clamping device 1 comprises a clamping module 2 and a fixing element 3. The fixing element 3 serves for the floating fastening of the clamping module 2 on the clamping base, such that it is still displaceable in the X-Y plane after the mounting of the fixing element. In practice, the clamping module 2 is fastened on the clamping base/machine table by means of the fixing element 3 such that in the X-Y plane formed by the upper side of the clamping base it can carry out a movement in the order of ca.±0.1 to 1 mm relative to the fixing element 3. Depending on the embodiment, greater movements of for example up to ca.±2 mm are also possible. Details relating thereto are subsequently explained more precisely. The clamping module 2 is provided with a plurality of clamping members in the form of clamping balls 15, arranged distributed along the circumference, by means of which the clamping element 26 can be tightened on the clamping device 1. The fixing element 3, configured substantially in an annular manner, is provided with two centering grooves 23, lying diametrically opposite one another, which are configured and arranged corresponding to two centering cams 28 arranged on the clamping element 26. These centering elements 23, 28 enable an aligning of the clamping element 26 during tightening on the clamping device 1 in one direction.

Figure 2:
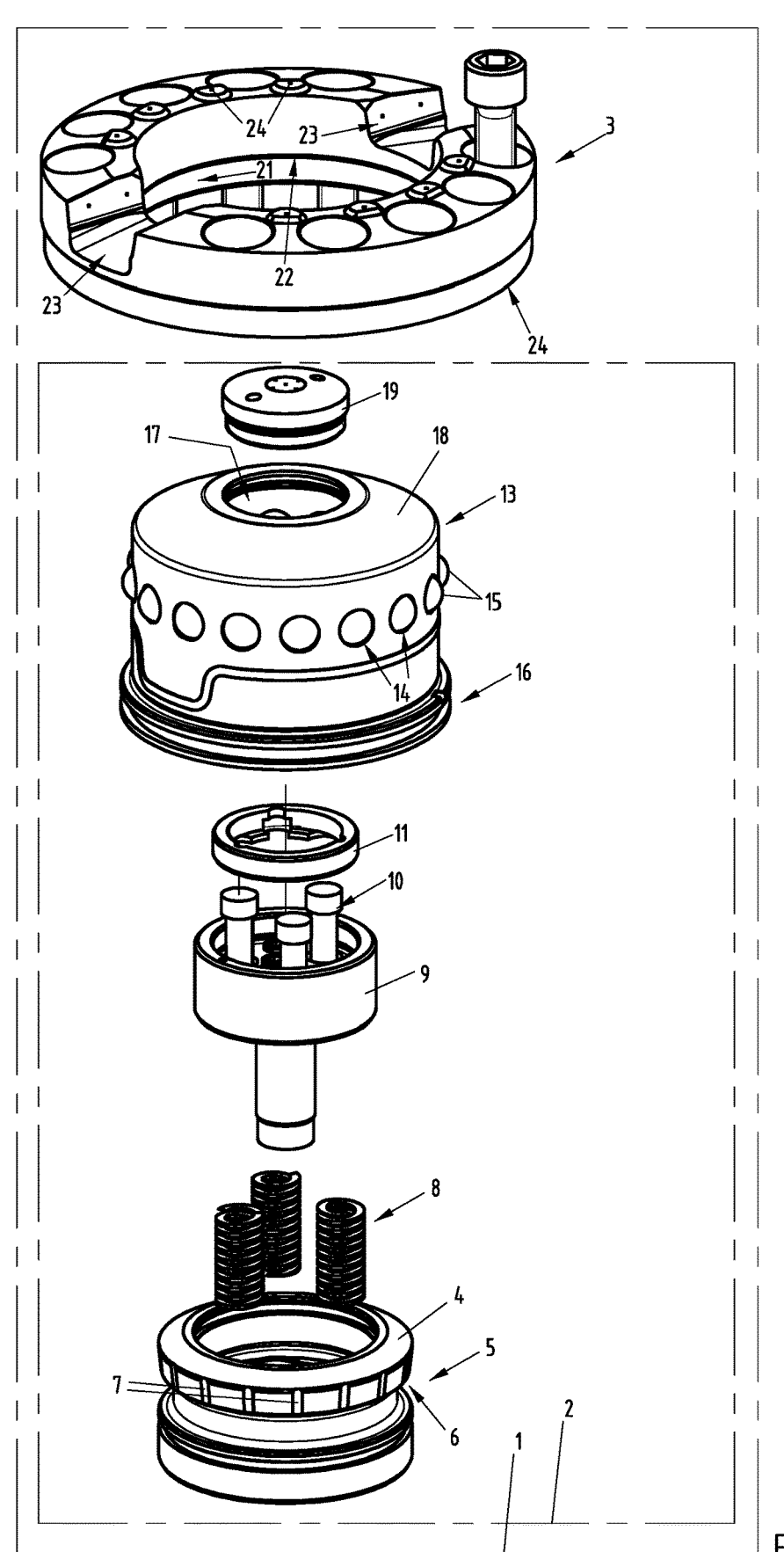
FIG. 2 individual parts of the clamping device according to FIG. 1 in exploded view.

With the aid of FIG. 2, which shows essential individual parts of the clamping device 1 in exploded view, the structure of the clamping device 1 is explained more closely. Viewed from bottom to top, the clamping module 2 comprises an actuating piston 4, three compression springs 8, an insert 9, three tappets 10, a holding ring 11, a clamping housing 13, which is provided with radial bores 15 for receiving the clamping balls 15, and an ejection element 19. The actuating piston 4, which is to be arranged in the interior of the clamping housing 13, is provided with an annular groove 5, into which the clamping balls 15 can extend with their inner side. The groove 5 is delimited on both sides by in each case an obliquely-running annular surface. Above the groove 5 a pressure surface 6 is arranged running along the outer circumference of the actuating piston 4, becoming smaller in diameter downwards, which serves for the actuating of the clamping balls 15 by the clamping balls 15 being pressed outwards, i.e., out from the clamping housing 13, on the lowering of the actuating piston 4. Depressions 7, running axially, i.e. in Z-direction, are let into this pressure surface 6, which depressions are coordinated with the clamping balls 15 such that on transferring of high clamping forces an enlarged support surface is brought about between the respective clamping ball 15 and the actuating piston 4, so that compared to conventional clamping arrangements in which the clamping balls come to abut in a punctiform manner against a flat clamping surface, higher clamping forces can be transferred.

The clamping housing 13 is provided on the underside with a shoulder 16 which is circumferential externally in an annular manner, which serves for the fixing of the clamping housing 13 or respectively of the clamping module 2 on a clamping base by means of the fixing element 3. The upper side of the clamping housing 13 is configured in a frustum-shaped manner, so that a conical centering surface 18 is formed. A central bore 17 is let into this frustum-shaped upper side of the clamping housing 13, which central bore serves for receiving the ejection element 19. The ejection element 19, arranged in the centre of the frustum, is provided with a conical upper side which is adapted at least partly to the shape and inclination of the frustum-shaped upper side of the clamping housing 13. The frustum-shaped upper side of the clamping housing 13 thus forms, together with the ejection element 19, a large centering surface for the respective clamping element on placing onto the clamping module 2.

The fixing element 3 is provided on the inner side with a circumferential recess in the form of a groove 21 which is coordinated with the shoulder 16 of the clamping housing 13. In Z-direction the groove 21 is delimited upwards by an inwardly extending projection 22, which forms the Z-stop for the shoulder 16. The groove 21 has a slightly larger diameter than the shoulder 16 of the clamping housing 13, so that a floating or respectively displaceable fixing of the clamping module 2 is made possible in the X-Y plane, as is explained more closely in the following. On its upper side, the fixing element 3 is provided with elevated support surfaces 24 serving as Z-support for the planar underside of the clamping element. As the fixing element 3 comes to abut with its large-area underside on a clamping base, it can receive, with a simple construction, high clamping forces acting in Z-direction onto the support surfaces 24. Providing the clamping module 2 with such Z-support surfaces for a workpiece carrier or the clamping element 26 would, in any case, be substantially more complex. In addition, the two centering grooves 23, let into the fixing element 3, lying diametrically opposite one another, can be seen.

Figure 3:
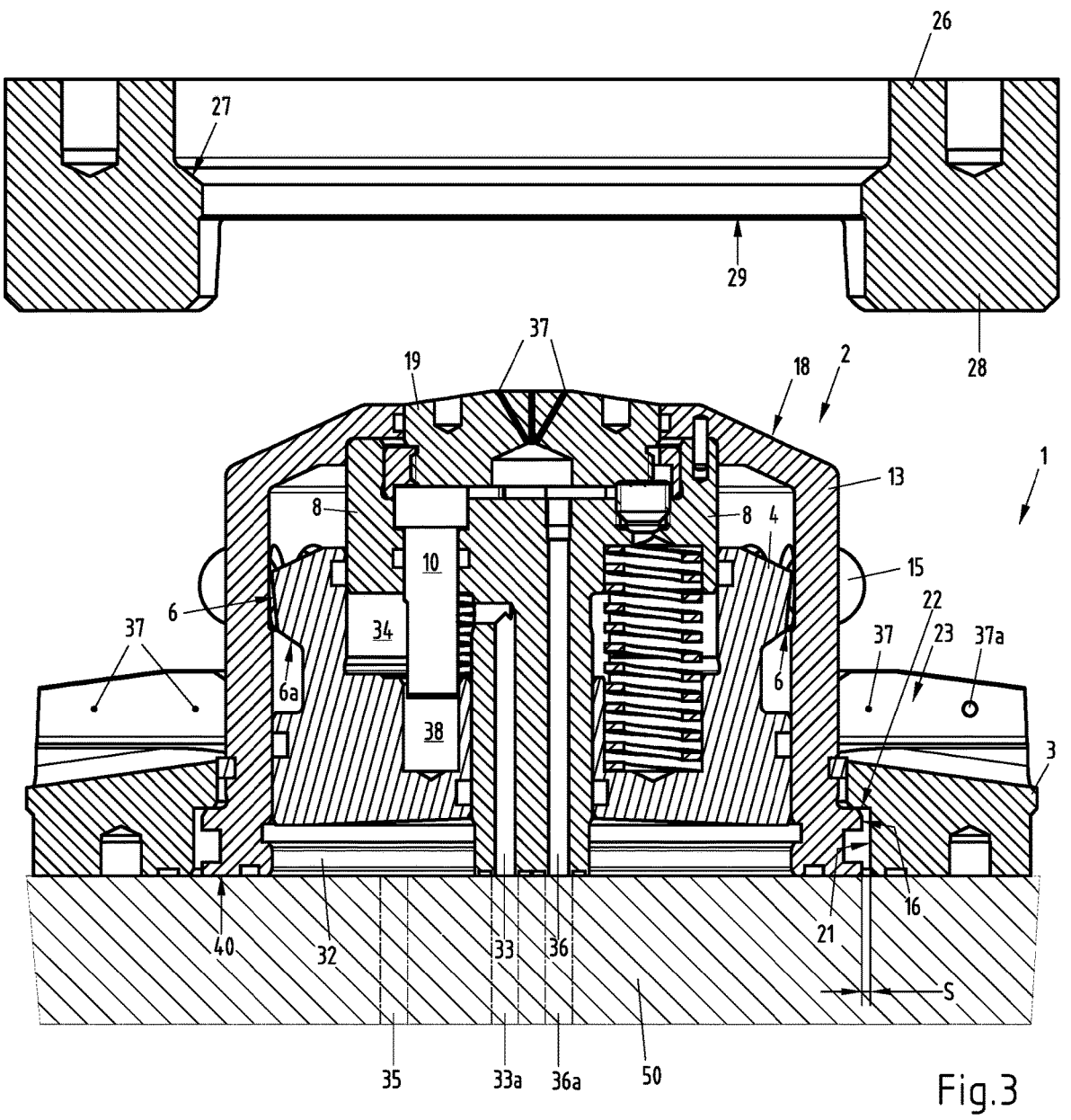
FIG. 3 the clamping device and the clamping element in sectional view.

FIG. 3 shows a section through the clamping element 26 in the region of its centering cam 28 and the clamping device 1 situated in the locking state. The clamping module 2 is fixed by means of the fixing element 3 on a clamping base 50, which is illustrated only by way of indication. In the fixed state, the annular shoulder 16 of the clamping module 2 extends in radial direction into the groove 21 of the fixing element 3. Whereas between the upper side of the shoulder 16 and the upper wall of the groove 21 which is let into the fixing element 3, a so-called "clearance fit" exists, i.e. a very small distance is provided between the upper side of the shoulder 16 and the upper boundary of the groove 21 in the order of a few micrometres, for example according to ISO H7/g6, a circumferential gap S exists with centred clamping module 2 in radial direction between the lateral surface of the shoulder 16 and the lateral wall of the groove 21 which is let into the fixing element. This gap S makes it possible that the clamping module 2 can be displaced radially, i.e., in the X-Y plane, out from the middle position shown here, by the size of the gap S in all directions, which in the present case is partly also designated as a floating mounting. Through the size of this gap S the maximum displacement path of the clamping module 2 is determined with respect to the fixing element 3. Preferably, this gap S amounts to at least 0.1 mm, so that the clamping module can be displaced out from the centred middle position by at least ±0.1 mm in the X-Y plane. However, a floating mounting is not necessarily to be understood to mean a mounting in which the clamping module is displaceable in all directions, i.e., through 360°, but rather it can be sufficient, if applicable, to limit the region of the displaceability or respectively floating mounting, in extreme cases to limit it to one direction. With a medium size of the clamping device, the outer diameter of the shoulder 16 is smaller by ca. 0.2 to 1 mm than the inner diameter of the recess 21 in the fixing element 3, so that the clamping module can be displaced out of the centred middle position radially by ca. 0.1 and 0.5 mm in the X-Y plane. Medium size is understood to mean a clamping device 1, the clamping module 2 of which has a diameter between ca. 8 and 12 cm and a height between ca. 5 and 8 cm. The size of the gap S or respectively the difference between the outer diameter of the shoulder 16 and the inner diameter of the recess 21 depends in particular on the size of the respective clamping device, especially as different sizes can be provided for workpiece carriers of different size. It shall be understood that larger workpiece carriers, in absolute terms, can also be subject to greater dimension changes, in particular thermally caused dimension changes. Another criterion for the size of the gap S can also depend in addition on which materials are used for the workpiece carrier and the clamping base, especially as different materials mostly have different coefficients of thermal expansion, which for example is the case for example with a clamping base made of steel and a workpiece carrier made of aluminium, as frequently occurs in practice. Therefore, it is entirely possible that in certain embodiments a gap S of more than one millimetre can be provided. For example, in particular structural forms, in particular in very large embodiments, a gap S in the order to up to ca. 2 mm can be provided, which corresponds to a possible displacement path of the clamping module 2 with respect to the fixing element 3 of ±2 mm.

The actuating piston 4, arranged in the interior of the clamping module 2, is displaceable in axial direction, i.e., in Z-direction, between an upper starting position and the lower locking position, illustrated here. In the present example, the actuating piston 4 under the action of the compression springs is situated in its downwardly displaced locking position. On lowering, the actuating piston 4 presses the clamping balls 15 radially outwards by its pressure surface 6 which is arranged on the outer side, widening upwards in a slightly conical manner. A lifting surface 6a runs beneath the actual pressure surface 6, which lifting surface, in contrast to the pressure surface 6 forms a small angle with the horizontal. The lifting surface 6a brings it about that on lowering of the actuating piston 4 the clamping balls 15 in a first phase, per path—stroke—of the actuating piston 4, are displaced radially quickly or respectively far towards the exterior, while in a second phase, through the pressure surface 6 only a comparatively small radial displacement of the clamping balls 15 is brought about per path—stroke—of the actuating piston 4. The geometry of the pressure surface 6 is, in addition, designed so that the actuating piston 4 remains in the locking position by means of self-locking. Such a configuration of a two-stage "infeed" in combination with a floating mounting of the respective clamping module, compared to conical centering elements, which must be coordinated with one another very precisely, places smaller requirements on the manufacturing tolerances of the elements which are decisive for the centering.

Furthermore, in the sectional illustration according to FIG. 3 it can be seen that a hydraulic line 33 and a pneumatic line 36 lead from the underside over the shaft of the insert 8 into the interior of the clamping module 2. The hydraulic or respectively pneumatic connection lines 33a, 36a leading through the clamping base 50 are only illustrated by way of indication. In any case, the two connection lines 33a, 36a are configured in such that they also enable a tight connection in the case of radial displacements of the clamping module 2 in the outlined framework. The hydraulic line 33 opens radially into an annular space 34 arranged above the central centre part of the actuating piston 4, which annular space can be acted upon hydraulically with excess pressure. The pneumatic line 36 is connected with a plurality of cleaning openings 37, via which air can be blown out for the cleaning of counter-surfaces. An exhaust opening 37a, enlarged in diameter, is let into the one lateral surface of the one centering groove 23. As the pressure drops rapidly in the pneumatic line via such an exhaust opening 37a, when this is not closed/sealed by a centering cam, this exhaust opening 37a can be used in particular in order to detect whether a workpiece carrier, provided with a clamping element 26, is present and is securely tightened on the clamping device 2. The advantage of an enlarged exhaust opening 37a with a diameter of at least 2 mm also consists in addition in that this is less liable to contamination compared to relatively small openings, which have for example a diameter of less than 1.5 mm, and can scarcely clog. In addition, a hydraulic line 35, leading into the pressure chamber 32 arranged beneath the actuating piston 4, is drawn by way of indication. On the upper side of the clamping module 2, the conically-running centering surface 18 can be seen. In addition, one of three tappets 10 and one of three compression springs can be seen. The shaft of the respective tappet 10 is received partially in a bore 38 in the actuating piston 4, wherein the depth of the bore 38 is configured such that the end of the tappet shaft, on raising of the actuating piston 4, only stands on the base of the bore 28 entirely at the end of the upwardly directed movement, and the ejection element 19 is pressed by the actuating piston 4 on the last part of its lifting movement upwards. In order to move the actuating piston 4 upwards into the starting position, the pressure chamber 32 beneath the actuating piston 4 is acted upon hydraulically with excess pressure such that the actuating piston 4 is displaced upwards contrary to the force of the three compression springs.

Compared to clamping systems with clamping spigots arranged on the workpiece carrier and clamping chucks configured in a corresponding manner thereto, substantially higher clamping forces can be realized with the clamping arrangement which is configured according to the invention, because an annularly configured clamping element 26, which surrounds the clamping module 2 radially, has a distinctly greater clamping surface, especially as the cylindrical clamping module 2 has a comparatively large external diameter and has distinctly more clamping members 15 compared to conventional clamping chucks. Through the depressions which are let into the actuating piston 4, the individual clamping member 15 can, in addition, transfer higher forces.

Figure 4:
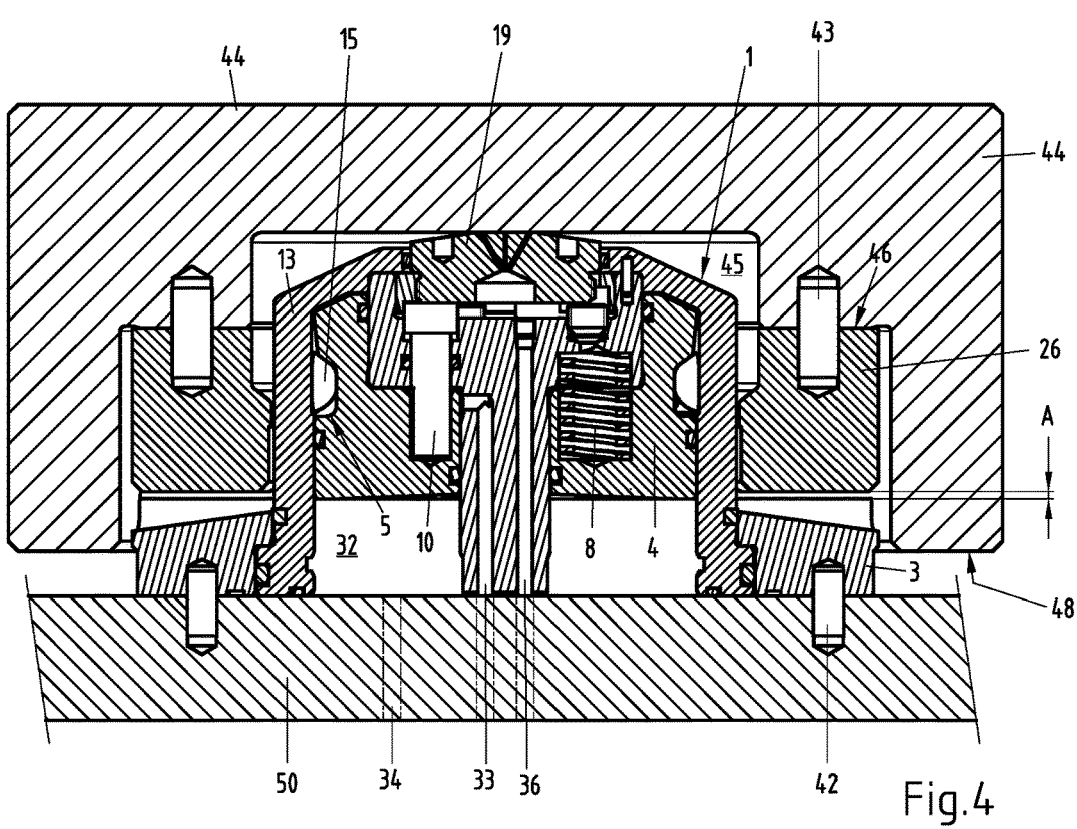
FIG. 4 a section through the clamping device in the starting position together with the clamping element, loosely placed thereon, fastened to a workpiece carrier.

FIG. 4 shows a section through the clamping device in the starting position together with the clamping element 26, loosely placed thereon, which is arranged in a stepped recess 45 of the workpiece carrier 44. The planar underside of the clamping element 26, serving as Z-support, as also its centering cam 28, are set back with respect to the underside 48 of the workpiece carrier 44. Thereby, the respective clamping element 26 is received in a protected manner in the workpiece carrier 44. In order to precisely align the fixing element 3 with respect to the clamping base 50 before fastening, pins 42 are provided, which are inserted into corresponding blind bores of the fixing element 3 and of the clamping base 50. In an analogous manner, pins 43 are provided for centering the clamping element 26 with respect to the workpiece carrier 44. For fastening the fixing element 3 on the clamping base 50, conventional screw connections are provided which, however, are not illustrated in closer detail. The clamping element 26 is likewise fastened with screws, not illustrated in closer detail, on the workpiece carrier 44. In order to displace the actuating piston 4 into the upper starting position, illustrated here, the pressure chamber 32 beneath the piston 4 is placed under excess pressure. On the upwardly directed movement of the actuating piston 4, the respective tappet 10 stands shortly before the end of the upwards movement on the base of the bore in the actuating piston 4 and participates in the last part of the upwards movement. Thereby, the tappets 10 press the ejection element 19 by ca. 1 mm beyond the upper side of the clamping housing 13, whereby the ejection element 19 places itself on the base of the stepped recess 45 and supports or slightly raises the workpiece carrier 44 in Z-direction.

In the raised state, the annular groove 5 of the actuating piston 4 comes to lie at the height of the clamping members 15, whereby these can be displaced back inwards into the annular groove 5, so that in the starting state of the clamping device 1, illustrated here, a clamping element 26 can be placed onto the clamping device 1 and can also be removed.

By both the depth of the recess 45 and also the height of the step 46 being coordinated to the clamping device 1 together with the clamping module 2, the workpiece carrier 44 comes to abut on the ejection element 19 on placing onto the clamping device 1. In practice, the ejection element 19 comes to abut on the base of the stepped recess 45 in the workpiece carrier 44, before the clamping element 26 is finally centred through its cams, engaging into the grooves of the clamping device, in a direction in the X-Y plane. In any case, the elements—workpiece carrier 44, —recess 45, —clamping element 26 and —clamping device 1/ejection element 19 are coordinated to one another such that in the loosely placed state of the workpiece carrier 44 a gap in the order of ca. 1 mm exists between the Z-supports 24 (FIG. 1) of the clamping device 1 and the planar underside 28 (FIG. 1) of the clamping element 26. Here, the cams of the clamping element 26 engage into the grooves of the clamping device 1 and centre the clamping element 26 in a direction in the X-Y plane roughly with respect to the clamping device 1. By the clamping element 26 being inserted into a recess of the workpiece carrier 44 and the planar underside, serving as Z-centering, being set back with respect to the underside 49 of the workpiece carrier 44, the clamping element 26 is well protected from external influences such as mechanical damage. Instead of a continuously planar underside 29, the clamping element 26 could also be provided only partially with planar surface portions.

Figure 5:
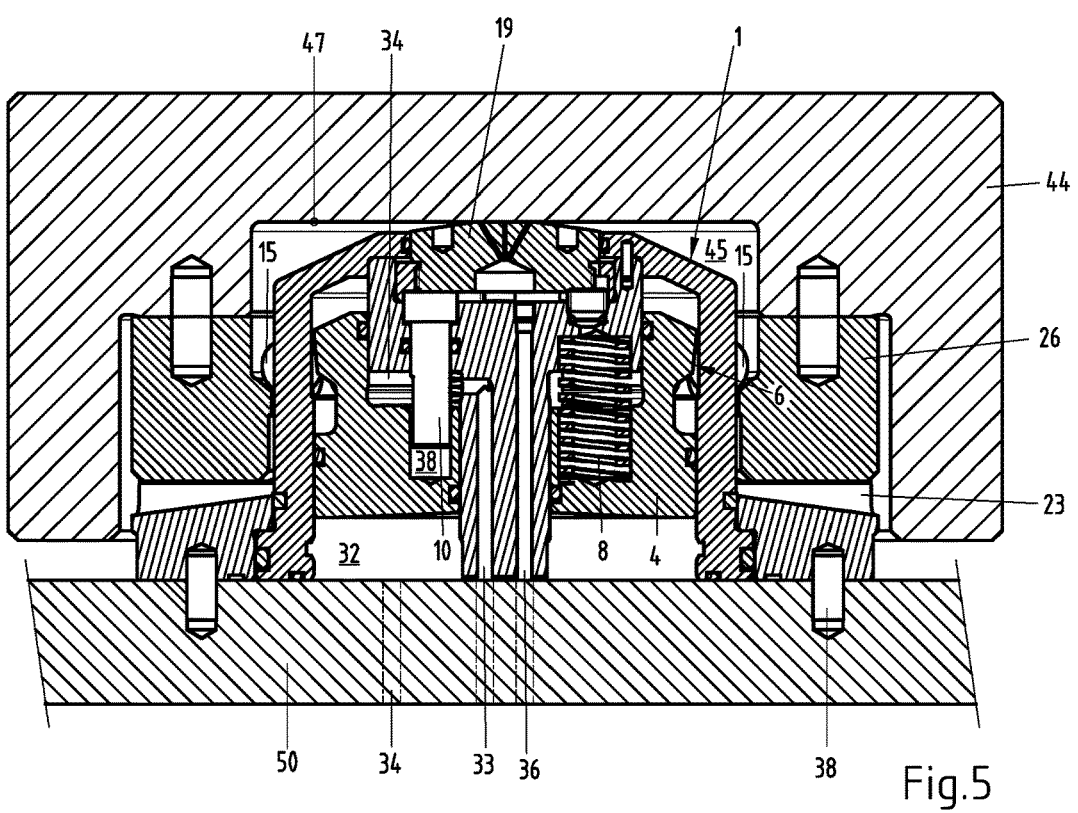
FIG. 5 a section through the clamping device together with the clamping element, tightened thereon, fastened to the workpiece carrier.

FIG. 5 shows the clamping device 1 in the locking position together with the workpiece carrier 44, tightened thereon by means of the clamping element 26. So that the actuating piston 4 can move from the starting position into the illustrated locking position, the excess pressure in the pressure chamber 32 is reduced, so that the actuating piston 4 under the action of the compression springs 8 moves downwards. Here, the actuating piston presses the clamping balls 15 radially outwards with its pressure surface 6, arranged on the exterior, widening slightly conically upwards. The clamping balls 15 place themselves on the annularly circumferential clamping surface 27 (FIG. 3) of the clamping element 26 and draw the latter downwards in Z-direction, until the planar underside of the clamping element 26 comes to abut on the Z-supports 24 (FIG. 1) of the clamping device 1. In so far as the ejection element 19, on lowering of the actuating piston 4, does not move automatically into its lower position of rest, this is pressed downwards by the base of the recess 45 in the workpiece carrier 44, especially as the tappets 10 no longer stand on the base of the bore 38 in the actuating piston 4 and can be displaced downwards together with the ejection element 19.

On tightening of the clamping element 26 on the clamping device 1, the cams of the clamping element 26 come to abut on the grooves of the clamping device and centre the clamping element 26 in a direction in the X-Y plane precisely with respect to the clamping device 1. Preferably, the spigot-groove centering elements are coordinated to one another such that both lateral surfaces of a centering spigot come to abut on both groove walls of the respective centering groove, before the planar underside of the clamping element 26 rests on the Z-supports 24 (FIG. 1) of the clamping device 1, namely when a gap in the order of a few micrometres up to several hundredths of a millimetre still exists between the underside of the clamping element 26 and the Z-supports 24. The fine centering between clamping element 26 and clamping device 1 is thus completed before the clamping element 26 comes to abut on the Z-supports of the clamping device.

In order to be able to complete the centering process in Z-direction, the elements of the clamping arrangement 1 which are essential for action are coordinated to one another with respect to dimensions and shape such that the removal of the said gap between the planar underside of the clamping element 26 and the Z-supports 24 of the clamping device 1 can take place through utilization of the material elasticity in the region of the centering spigot and the centering groove. Therefore, no spring-elastic yielding elements in Z-direction, as are mostly present in the clamping systems configured according to the prior art, need to be provided.

After the tightening of the clamping element 26 on the clamping device 1, the clamping force can be additionally increased, by the annular space 34 above the actuating piston 4 being acted upon hydraulically or pneumatically with a high pressure. As the actuating piston 4 is held in the locking position by means of self-locking, the high clamping force also remains after removal of the hydraulic or pneumatic excess pressure.

The cleaning openings, fed via the pneumatic line 36, including the enlarged exhaust opening are arranged such that on tightening of the clamping element 26 on the clamping device 1 by the clamping element 26 or respectively its centering elements they are closed/sealed. This makes it possible that by monitoring the pressure or the air flow in the pneumatic line 36 it can be established whether a clamping element 26 is present and, if applicable, is securely tightened.

The clamping arrangement 1 illustrated in FIGS. 1 to 5 forms the base element for forming a clamping system, with which in particular large and/or heavy workpieces or respectively workpiece carriers can be tightened in the working region of a processing machine, for example a milling machine, grinding machine, eroding machine or a lathe. Under the term large or respectively very large workpiece carriers, workpiece carriers are to be understood which typically have a dimension between ca. 0.5 m and 2 m. Workpieces with a total weight of up to several thousand kilograms can be fastened on such workpiece carriers. In any case, such a clamping arrangement forms a modular component, by means of which large to very large clamping systems can be realized.

FIG. 6 shows a first example embodiment of such a clamping system with four clamping devices 1a, 1b, 1c, 1d arranged on a clamping base 50 to a clamping assembly, and four clamping elements 26a, 26b, 26c, 26d arranged on a workpiece carrier 44. As illustrated, the X- and the Y-axis run parallel to the upper side/surface of the clamping base 50, whereas the Z-direction runs perpendicularly thereto. Thus, the X-Y plane of the clamping arrangement is defined through the upper side/surface of the clamping base 50.

The four clamping devices 1a, 1b, 1c, 1d are arranged on the upper side of the clamping base 50, and the four clamping elements 26a, 26b, 26c, 26d are fastened in corresponding recesses 45a, 45b, 45c, 45d in the workpiece carrier 44. The clamping base 50 can also be, for example, the table of a processing machine. Both the clamping devices 1a, 1b, 1c, 1d and also the clamping elements 26a, 26b, 26c, 26d are configured according to the previously explained example embodiment. The workpiece carrier 44 has a continuously planar underside 48. The upper side of the clamping base 50 forms here in turn the X-Y plane. The advantages of a floating or respectively displaceable fixing of the respective clamping module 2a-2d in the X-Y plane come into play most particularly in the case of clamping assemblies which comprise three or more clamping devices. Whereas in each of the four clamping devices 1a, 1b, 1c, 1d the respective clamping module 2a, 2b, 2c, 2d is mounted in a floating manner, the four clamping elements 26a, 26b, 26c, 26d are connected securely and immovably to the workpiece carrier 44. In the case of the clamping devices 1a-1c; 1b-1d lying diagonally opposite one another, or respectively fixing elements 3a-3c; 3b-3d, the centering grooves lie respectively on a shared longitudinal centre axis L1, L2 whereas in the case of the clamping elements 26a-26c; 26b-26d, lying diagonally opposite one another, their centering cams 28a-28c; 28b-28d lie on a shared longitudinal centre axis M1, M2, wherein the four clamping devices 1a, 1b, 1c, 1d or respectively the grooves 23a, 23b, 23c, 23d of the fixing elements 3a, 3b, 3c, 3d are arranged in position and alignment corresponding to the clamping elements 26a, 26b, 26c, 26d including their centering cams 28a, 28b, 28c, 28d, so that the workpiece carrier 44 on tightening by means of the four clamping devices 1a, 1b, 1c, 1d is aligned in X-, Y- and Z-direction. As the clamping modules 2a, 2b, 2c, 2d are received in radial direction or respectively in the X-Y plane in a floating manner in the fixing elements 3a, 3b, 3c, 3d, these changes in length of the workpiece carrier 44 with respect to the clamping base 50 are able to receive/equalize up to a specified measurement. However, care is to be taken that on mounting, the distance between the respective centre—middle—of the fixing elements 3a, 3b, 3c, 3d fastened on the clamping base 50, corresponds both laterally and also diagonally as exactly as possible to the distance between the respective centre of the clamping elements 26a, 26b, 26c, 26d, fastened on the workpiece carrier 44, so that the clamping modules 2a, 2b, 2c, 2d in radial direction, i.e. in the X-Y plane, are able to equalize dimension changes—expansions or respectively shrinkages—of the workpiece carrier 44 in relation to the clamping base 50. In this way, a self-centering clamping system arises in which mechanical overconstraints in the X-Y plane are prevented. By the clamping module 2 or respectively the actuating piston being provided with a two-stage "infeed" and the respective clamping module 2 being mounted in a floating manner in the X-Y plane, comparatively small requirements are set for the manufacturing tolerances of the crucial elements for the clamping and centering, namely the clamping module 2 together with the fixing element 3 and the clamping element 26.

On mounting of the clamping devices 1a, 1b, 1c, 1d on the clamping base 50 and of the clamping modules 2a, 2b, 2c, 2d on the workpiece carrier 44, care is to be taken that the clamping base 50 and the workpiece carrier 44 have approximately the same temperature, so that for example thermally caused dimension changes of the workpiece carrier 44 can be absorbed/equalized in both directions. The zero point in such a clamping system lies on the intersection P of the two longitudinal centre axes L1, L2 of clamping devices 1a, 1c; 1b, 1d lying diagonally opposite one another on the clamping base 50. In any case, the zero-point P also does not move if the respective clamping module were to move in the X-Y plane in the predetermined direction, for example in order to receive thermally caused dimension changes of the workpiece carrier 44, so that with a given zero point a workpiece carrier 44 can be repeatedly tightened precisely on the clamping base 50. Tests have shown that a repeat accuracy on tightening of a workpiece carrier 33 in the order to ca.+−5 micrometres is achieved.

In the case of a square clamping base, as is illustrated in FIG. 6, the centering elements—centering grooves—of adjacent clamping devices are rotated respectively about 90° with respect to one another and the longitudinal centre axes L1, L2 intersect each other at an angle of 90°. The same applies to square workpiece carriers, in which the centering elements—centering cams—of adjacent clamping elements are likewise rotated about 90° with respect to one another. In the case of rectangular, but not square, clamping bases, the intersection angle of the longitudinal centre axes L1, L2 generally deviates from 90°.

By the clamping modules 2a-2c of the clamping devices 1a-1d being provided with large-area conical centering surfaces 18 (FIG. 3), the positioning of the workpiece carrier 44 with respect to the clamping base 50 is comparatively simple, since in the case of average sizes of the respective clamping arrangement, its clamping modules 2 have a diameter in the order of ca. 8 to 12 cm, the respective clamping element 26 centres itself with respect to the associated clamping device up to a lateral offset of up to ca. 2 cm on putting in place. The workpiece carrier 44 thus only needs to be positioned roughly, i.e., to ca. 1-2 cm precisely with respect to the clamping base 50 before putting in place. On lowering, the fine positioning then takes place, by the respective clamping element sliding along with its underside on the conical centering surface of the corresponding clamping module 2a-2d until the respective clamping element 26a-26d is aligned concentrically to the associated clamping module 2a-2d. In this centering process, in addition the clamping modules 2a-2d can move along the predetermined direction in the X-Y plane and can align themselves precisely to the corresponding clamping elements 26a-26d, by substantially undertaking the diagonal distance of the corresponding clamping elements 26a-26c owing to their floating mounting. Thereafter, the workpiece carrier 44 can be lowered, so that the centering cams of the respective clamping element 26a-26d engage into the grooves of the corresponding fixing element 3a-3d and align the workpiece carrier 44 in an accurately angled manner. In the subsequent tightening of the workpiece carrier 44, the precise adapting then also takes place of the diagonal distance, by through the clamping balls, engaging on the respective clamping element 26a-26d, of the clamping module 2a-2d, the latter is moved precisely towards the centre of the corresponding clamping element 26a-26d. Here, the clamping balls of the clamping module 2a-2d draw the respective clamping element 26a-26d downwards until the latter comes to abut with its planar underside on the Z-supports of the respective fixing element 3a-3c. By the fixing elements 3a-3d being fastened on the clamping base 50 and the respective clamping module 2a-2d being received in Z-direction by means of a clearance fit in the respective fixing element 3a-3d, the clamping modules 2a-2d, on tightening of the workpiece carrier 44, can not "divert" upwards, so that a sufficiently high clamping force can be applied and can be transferred in Z-direction. When it is stated that the fixing element 3 is non-displaceable in Z-direction, this does not mean that it is not yielding in Z-direction within a very close tolerance of a few micrometres, caused on the one hand by the play of the clearance fit and on the other hand by the elasticity of the different elements and materials.

FIG. 7 shows an alternative example embodiment of a clamping system, which is suitable for smaller workpiece carriers. This clamping system has three clamping devices 1a, 1b, 1c arranged on a clamping base 50, and three clamping elements 26a, 26b, 26c arranged on a workpiece carrier 44. The clamping devices 1a, 1b, 1c are uniformly distributed on the clamping base, so that all three clamping devices 1a, 1b, 1c have the same distance with respect to one another, and the longitudinal centre axes L1, L2, L3 placed by the centering elements—grooves—of the fixing elements 3a, 3b, 3c arranged on the clamping base, respectively form an angle of 120° with one another. In this example, the zero point lies on the intersection P2 of the three longitudinal centre axes L1, L2, L3. The clamping elements 26a, 26b, 26b arranged on the workpiece carrier 44 are arranged in a corresponding manner to the clamping devices 1a, 1b, 1c of the clamping base 50. In the tightened state, the longitudinal centre axes M1, M2, M3 of the workpiece carrier 44 running through the centering elements—cams—run parallel to the longitudinal centre axes L1, L2, L3 placed by the centering elements—grooves—of the fixing elements 3a, 3b, 3c.

The mode of operation on tightening of the workpiece carrier 44 on the clamping base 50 or respectively on the clamping assembly is basically the same as in the example embodiment according to FIG. 6, so that this is not entered into in further detail here.

FIG. 8 shows an alternative example embodiment of a clamping system, which is provided with a round clamping base 50a and a round workpiece carrier 44a. As both the clamping devices and also the clamping elements are configured identically to those according to FIG. 6, these also bear identical reference numbers. This clamping system has four clamping devices 1a, 1b, 1c, 1d arranged uniformly along a circle line on the clamping base 50a to a clamping assembly, and four clamping elements 26a, 26b, 26c, 26d corresponding thereto, arranged on the workpiece carrier 44a. The X- and the Y-axes also run here parallel to the upper side/surface of the clamping base 50a and form the X-Y plane, whereas the Z-direction runs perpendicularly thereto.

The four clamping devices 1a, 1b, 1c, 1d are arranged on the upper side of the clamping base 50a, preferably in its outer region, i.e. in any case not close to the centre, whereas the clamping elements 26a, 26b, 26c, 26d are arranged corresponding thereto and are received in corresponding recesses 45a, 45b, 45c, 45d in a protected manner in the workpiece carrier 44. The clamping modules 2a-2d are in turn mounted in a floating manner in the X-Y plane. In the case of the clamping devices 1a-1c; 1b-1d lying diametrically opposite one another, or respectively fixing elements 3a-3c; 3b-3d, the centering grooves 23a-23c; 23b-23d lie in turn on a shared longitudinal centre axis L1, L2, whereas in the case of the clamping elements 26a-26c; 26b-26d lying diametrically opposite one another, their centering cams 28a-28c; 28b-28d lie on a shared longitudinal centre axis M1, M2, wherein the four clamping devices 1a, 1b, 1c, 1d or respectively the grooves 23a, 23b, 23c, 23d of the fixing elements 3a, 3b, 3c, 3d are arranged in position and alignment corresponding to the clamping elements 26a, 26b, 26c, 26d including their centering cams 28a, 28b, 28c, 28d, so that the workpiece carrier 44a on tightening by means of the four clamping devices 1a, 1b, 1c, 1d is aligned in X-, Y- and Z-direction.

It also applies here again that an arranging of the clamping devices 1a, 1b, 1c, 1d in the outer region of the clamping base 50a brings with it the advantage that such a clamping arrangement can receive both very high torsion moments and also very high tilting moments.

The longitudinal axis centre axes L1, L2 leading through the respective centering elements—centering grooves 23a, 23b, 23c, 23d—of a clamping module 2a, 2b, 2c, 2d intersect in the centre P1 of the clamping base 50a, whereas the longitudinal axis centre axes M1, M2 leading through the respective centering elements—centering cams 28a, 28b, 28c, 28d—of a clamping element 26a, 26b, 26c, 26d intersect in the centre P2 of the workpiece carrier 44a.

If necessary, of course also a round clamping base can be combined with a rectangular workpiece carrier or a round workpiece carrier can be combined with a rectangular clamping base.

It shall be understood that the previous example embodiments are not to be regarded as conclusive or comprehensive. Thus, within the scope of the invention, alternatively to the example embodiments according to FIGS. 6,7 and 8, clamping systems with more than three or respectively four clamping devices can also be realized. For example, clamping systems with six or eight clamping devices can be formed, wherein in the case of very large clamping systems the respective clamping module can be displaceable radially, i.e., in the X-Y plane, if applicable by more than the previously indicated 0.5 mm. In the case of more than four clamping devices, it is also not absolutely necessary that all the clamping devices or respectively clamping elements are provided with centering elements—centering grooves/centering cams, but rather if applicable in the case of individual clamping devices and/or clamping elements, the centering elements can be dispensed with, so that the respective clamping device only undertakes a clamping function, but not a centering function. The term workpiece carrier also does not necessarily always stand for an element for the receiving of workpieces, but rather, if applicable, a tool or something different can also be fastened thereon, wherein the clamping elements if applicable cold also be fastened directly on the workpiece, so that the workpiece itself would be the workpiece carrier. In addition, a workpiece carrier also does not have to be round or rectangular, but for example can also be oval, hexagonal or octagonal.

Some advantages of clamping devices or respectively clamping systems configured according to the invention can be summarized as follows:

By the respective clamping module being mounted in a floating manner such that it is still displaceable after the fixing in the X-Y plane, dimension changes of the workpiece carrier can be absorbed with very high clamping accuracy;

Through the floating mounting of the clamping modules, a mechanical overconstraining of the clamping system in the X-Y plane can be prevented;

The respective clamping module can generate very high clamping- and holding forces and can also receive high transverse forces;

The clamping device or respectively the respective clamping module is constructed in a simple and compact manner and has a comparatively small overall height;

The clamping elements can be fixed in a mechanically protected manner on the workpiece carrier;

With the clamping devices and clamping elements, configured in modular construction, average to very large clamping systems can be realized for average to very large and heavy workpiece carriers;

Also, very large workpiece carriers can be tightened on the clamping base with a repeat accuracy in the range of ca. 10 to 20 micrometres;

The clamping devices can be arranged simply and quickly on differently configured clamping bases;

The clamping elements can be arranged simply and quickly on differently configured workpiece carriers;

The respective clamping element is securely locked by means of the mechanically and if applicable hydraulically or pneumatically additionally loaded actuating piston;

The actuating piston is held by means of self-locking in the locking position, so that also in the case of a power failure the clamping element remains securely tightened.

The compression springs ensure that the clamping force is also maintained in the energy-free state;

The clamping devices have a dirt-tolerant design and are easy to clean;

The clamping system reacts insensitively with respect to temperature-caused length changes of the workpiece carrier;

By the respective clamping device being arranged externally or respectively in a corner region, and thus the centering and also the holding-down taking place there, in particular compared to clamping devices arranged close to the centre, both very high torsion moments and also very high tilting moments can be received.

| List of reference numbers: | |
| --- | --- |
| 1. | clamping device |
| 2. | clamping module |
| 3. | fixing element |
| 4. | actuating piston |
| 5. | annular groove |
| 6. | pressure surface |
| 7. | axial depressions |
| 8. | compression springs |
| 9. | insert |
| 10. | tappet |
| 11. | holding ring |
| 12. | |
| 13. | clamping housing |
| 14. | bores |
| 15. | clamping balls (clamping members) |
| 16. | shoulder |
| 17. | central bore |
| 18. | conical centering surface |
| 19. | ejection element |
| 20. | |
| 21. | recess (fixing element) |
| 22. | projection (fixing element) |
| 23. | centering grooves (fixing element) |
| 24. | Z-supports (fixing element) |

-continued

| List of reference numbers: | |
| --- | --- |
| 25. | |
| 26. | clamping element |
| 27. | clamping surface |
| 28. | centering cam |
| 29. | planar underside |
| 30. | screws clamping device |
| 31. | screws clamping element |
| 32. | pressure chamber (beneath piston) |
| 33. | hydraulic line |
| 34. | annular space (above piston) |
| 35. | feed line hydraulic |
| 36. | pneumatic line |
| 37. | cleaning openings |
| 38. | bore |
| 39. | pressure chamber above piston |
| 40. | underside clamping module |
| 41. | |
| 42. | pins base |
| 43. | pins workpiece carrier |
| 44. | workpiece carrier (pallet) |
| 45. | stepped recess |
| 46. | step |
| 47. | base of the recess |
| 48. | underside workpiece carrier |
| 49. | |
| 50. | clamping base |
| 51. | |
| 52. | |
| 53. | |
| 54. | |
| 55. | |
| 56. | |
| 57. | |
| 58. | |
| 59. | |
| 60. | |
| 61. | |
| 62. | |
| 63. | |
| 64. | |
| 65. | |
| 66. | |
| 67. | |
| 68. | |
| 69. | |
| 70. | |

The invention claimed is:

1. A clamping arrangement having a clamping device able to be fastened on a clamping base and a clamping element able to be tightened on the clamping device, wherein the clamping device comprises:

a clamping module including clamping members for engaging the clamping element to tighten the clamping element on the clamping device; and a fixing element configured to fix the clamping module on the clamping base, wherein the fixing element is configured such that the clamping module can be fixed, in a fixed state of the fixing element, in an X-Y plane, defined by an upper side of the clamping base, in a displaceable manner on the clamping base, wherein the fixing element has centering grooves or centering cams and the clamping element has centering cams or respectively centering grooves, configured in a corresponding manner thereto, for centering the clamping element with respect to the fixing element in the X-Y plane in one direction.

2. The clamping arrangement according to claim 1, wherein:

the fixing element is configured, in the fixed state, to fix the clamping module in a displaceable manner with respect to the fixing element in the X-Y plane, the clamping module is received in the fixing element in the Z-direction, relative to the X-Y plane, by means of a clearance fit, and the fixing element is provided with Z-support surfaces for supporting the clamping element in the Z-direction.

3. The clamping arrangement according to claim 1, wherein the clamping module is configured substantially cylindrically and the fixing element is configured substantially in an annular manner, wherein the clamping module is received in the X-Y plane with radial play in a floating manner in the fixing element.

4. The clamping arrangement according to claim 3, wherein the clamping module is provided on the outer side with a circumferential shoulder and the fixing element is provided on the inner side with a recess configured in a corresponding manner thereto, wherein the outer diameter of the shoulder is smaller by at least 0.2 mm, in particular by at least 0.5 mm, than the diameter of the recess.

5. The clamping arrangement according to claim 4, wherein the clamping module is received in the Z-direction, relative to the X-Y plane, by means of a clearance fit in the fixing element, in particular by the height of the shoulder being adapted to the height of the recess such that in the Z-direction a clearance fit is formed between the shoulder and the recess.

6. The clamping arrangement according to claim 1, wherein the clamping module is provided with a plurality of clamping members arranged distributed over the circumference, and the clamping element is provided on the inner side with an annularly circumferential clamping surface, on which the clamping members abut for tightening.

7. The clamping arrangement according to claim 1, wherein the clamping module has a spring-loaded actuating piston, which is arranged for actuation of the clamping members axially movably in the interior of the clamping module.

8. The clamping arrangement according to claim 7, wherein the actuating piston is displaceable pneumatically or hydraulically from an active position, and wherein the actuating piston is under the action of springs and if applicable is additionally loaded hydraulically or pneumatically, and wherein the actuating piston presses the clamping members radially towards the exterior, into a starting position in which the clamping members are relieved and are able to be displaced radially inwards, wherein the actuating piston is held in the active position in particular by means of self-locking.

9. The clamping arrangement according to claim 7, wherein the actuating piston is able to be brought into operative connection with an ejection element, able to be displaced in the Z-direction, relative to the X-Y plane, which is movable beyond the upper side of the clamping module by means of the actuating piston.

10. A clamping arrangement, having a clamping device able to be fastened on a clamping base and a clamping element able to be tightened on the clamping device, wherein the clamping device comprises:

a clamping module including clamping members for engaging the clamping element to tighten the clamping element on the clamping device; and a fixing element configured to fix the clamping module on the clamping base, wherein the fixing element is configured such that the clamping module can be fixed, in a fixed state of the fixing element, in an X-Y plane, defined by an upper side of the clamping base, in a displaceable manner on the clamping base, wherein the clamping module has a spring-loaded actuating piston, which is arranged for actuation of the clamping members axially movably in the interior of the clamping module, and wherein the actuating piston has depressions running in the Z-direction, relative to the X-Y plane, which are coordinated with the clamping members such that on tightening of the clamping element an enlarged support surface is brought about between the respective clamping member and the actuating piston.

11. The clamping arrangement according to claim 9, wherein the upper side of the clamping module is configured in frustum-shaped manner and the ejection element is arranged in the centre of the frustum.

12. A clamping system with a clamping base, a workpiece carrier and at least three clamping arrangements configured according to claim 1, which has at least three clamping devices arranged on the clamping base and a corresponding number of clamping elements arranged on the workpiece carrier, wherein the upper side of the clamping base forms the X-Y plane, wherein the respective clamping device is provided with first centering elements and the associated clamping element with further centering elements corresponding thereto, for centering the respective clamping element with respect to the clamping device in a direction in the X-Y plane, wherein at least with two clamping devices and two clamping elements arranged in a corresponding manner thereto, the directions are different in the X-Y plane.

13. The clamping system according to claim 12, wherein the clamping base is configured substantially in a rectangular manner and has an even number of clamping devices, wherein at least in each corner region a clamping device is arranged, and wherein the longitudinal axis centre axes leading through the centering elements of the respective clamping device arranged in the corner region also lead through the centre of clamping devices lying diagonally opposite one another.

14. The clamping system according to claim 12, wherein the workpiece carrier is configured in a substantially round manner and is provided with at least three clamping elements arranged in an outer region of the workpiece carrier, wherein the clamping elements are arranged in particular such that the longitudinal axis centre axes leading through the respective centering elements of a clamping element meet or intersect in the centre of the workpiece carrier.

15. The clamping system according to claim 12, characterized in that the workpiece carrier is configured substantially in a rectangular manner and a clamping element is arranged at least in each corner region, wherein the longitudinal axis centre axes leading through the centering elements of the respective clamping elements arranged in the corner region also lead through the centre of clamping elements lying diagonally opposite one another.

16. The clamping system according to claim 14, wherein the respective clamping element is arranged in a recess of the workpiece carrier such that a planar underside of the respective clamping element and the centering elements are set back with respect to the underside of the workpiece carrier.

17. A clamping element for use in a clamping arrangement according to claim 1, wherein the clamping element is configured substantially in an annular manner and has on the inner side an annularly circumferential clamping surface, on which clamping members can abut for tightening, and that the clamping element is provided at least partly with a planar underside serving as a Z-support.

18. A clamping element for use in a clamping system according to claim 12, wherein the clamping element is configured substantially in an annular manner and has on the inner side an annularly circumferential clamping surface, on which clamping members can abut for tightening, and that the clamping element is provided at least partly with a planar underside serving as a Z-support.

19. The clamping arrangement according to claim 10, wherein the actuating piston is displaceable pneumatically or hydraulically from an active position, and wherein the actuating piston is under the action of springs and if applicable is additionally loaded hydraulically or pneumatically, and wherein the actuating piston presses the clamping members radially towards the exterior, into a starting position in which the clamping members are relieved and are able to be displaced radially inwards, wherein the actuating piston is held in the active position in particular by means of self-locking.

20. The clamping arrangement according to claim 10, wherein the actuating piston is able to be brought into operative connection with an ejection element, able to be displaced in the Z-direction which is movable beyond the upper side of the clamping module by means of the actuating piston.

\* \* \* \* \*